United States Patent [19]

Exner et al.

[11] 4,185,506
[45] Jan. 29, 1980

[54] APPARATUS FOR MEASURING THE PRE-TENSION OF A THREADED BOLT

[75] Inventors: Gerhard Exner; Volfango Festinori; Detlef Luckschus, all of Berlin, Fed. Rep. of Germany

[73] Assignee: Kraftwerk Union Aktiengesellschaft, Mülheim, Fed. Rep. of Germany

[21] Appl. No.: 954,850

[22] Filed: Oct. 26, 1978

[30] Foreign Application Priority Data

Nov. 3, 1977 [DE] Fed. Rep. of Germany ....... 2749538

[51] Int. Cl.² .............................................. G01L 5/24
[52] U.S. Cl. ...................................... 73/761; 81/57.38
[58] Field of Search .................................. 73/761, 847; 116/DIG. 34; 81/52.4 R, 52.4 A, 52.4 B, 57.38; 85/62, 1 T

[56] References Cited

U.S. PATENT DOCUMENTS

| 2,562,831 | 7/1951 | Stone | 73/761 X |
| 2,995,033 | 8/1961 | Stifano, Jr. | 73/761 |
| 3,162,071 | 12/1964 | Biach | 81/57.38 |
| 3,837,694 | 9/1974 | Frisch et al. | 85/1 T |
| 3,877,326 | 4/1975 | Köck et al. | 81/57.38 |
| 3,943,819 | 3/1976 | Charron | 73/761 X |
| 3,995,828 | 12/1976 | Orban | 81/57.38 X |

FOREIGN PATENT DOCUMENTS 2604510 8/1977 Fed. Rep. of Germany ............. 73/761

*Primary Examiner*—Gerald Goldberg
*Assistant Examiner*—Joseph W. Roskos
*Attorney, Agent, or Firm*—Kenyon & Kenyon

[57] ABSTRACT

An arrangement for measuring the pre-tension of a threaded bolt having a central drill hole. A part is fastened to the lowest point of the drill hole and the difference in length of the part relative to the threaded bolt is determined via a length measuring device. An electric holding magnet, introduced into the hole, is fastened to a cable running from a cable drum and carrying an electromagnet, which, when excited, adheres to the closed hole at its lowest point; the cable is tightened and its length is held constant by a ratchet. The cable drum is movably supported on a tube connected to the threaded bolt in such a manner that, when the cable is loose, its carrier is pushed by a spring surrounding the tube against an upper flange on the tube; a length measuring device borne on the carrier contacts a surface of the tube. The measurement is performed with the cable tightened and its length held constant by the ratchet.

7 Claims, 1 Drawing Figure

APPARATUS FOR MEASURING THE PRE-TENSION OF A THREADED BOLT

BACKGROUND OF THE INVENTION

This invention relates to an apparatus for measuring the pre-tension of a threaded bolt serving particularly for closing a reactor pressure vessel. The measurement is accomplished by means of a part which is introduced into a central drill hole of the threaded bolt and which is fastened at the lowest point of the hole, eg. where it is closed by the head of the threaded bolt, and by means of a length measuring device which determines the length difference between the threaded bolt and the introduced part.

Such a measuring arrangment is shown in U.S. Pat. No. 3,877,326 in connection with the threaded bolts used for closing a nuclear reactor vessel. There, a rod is introduced into the central hole of a bolt and is screwed in the end of the hole in the head of the threaded bolt. When the threaded bolt is stretched to obtain pre-tension, the rod in the hole remains unstressed and the pre-tension of the threaded bolt is determined by the difference in length between the inserted rod and the threaded bolt, as measured by a length measuring device such as a dial indicator.

Since, in this prior art measuring apparatus, the rod used for the measurement must be inserted and screwed fast into the hole of each threaded bolt and then removed after the measurement so as to leave the hole free for other non-destructive material tests which are part of normal maintenance, much time is consumed in the performance of this part of the test routine. As the lengthening of the threaded bolt required for the pre-tensioning is usually accomplished by mechanical and, usually, automatic tensioning devices, it is an object of the invention to provide a similar automatic measuring apparatus which can be attached to the tension device.

BRIEF DESCRIPTION OF THE INVENTION

According to the invention, a measuring apparatus of the type described includes a cable running off a drum into the central hole carrying an electric holding magnet on its end. When the magnet reaches the lowest point of the closed hole, it is energized and sticks. The cable is then tightened and its length is held constant by a ratchet. The cable drum is carried by movable support on a tube which, in turn, is connected directly or indirectly to the threaded bolt in such a manner that, when the cable is loose, the support is pushed by a spring until it stops against an upper flange on the tube. The movable support also carries the length measuring device which has an end resting on a surface of the tube.

This measuring apparatus has the advantage that it can be operated automatically, since the electric holding magnet which adheres to the lowest point of the hole and holds the cable in stretched condition also serves as an unstressed reference member for measuring the pre-tension of the threaded bolt. Cable tension is obtained by means of a spring which surrounds and is supported by the tube and acts on the movable support of the measuring assembly. A ratchet which is detented when the cable is tight holds the length of the cable constant during the elongation of the threaded bolt and the measurement. The elongation of the threaded bolt displaces the support device along with the measuring apparatus and the tube, the tube being connected directly or indirectly to the threaded bolt. Pre-tension of the threaded bolt can thus be measured as the difference in length between the attachment point of the cable and a surface of the tube. The measuring apparatus can be mounted on the tensioning device used for elongating the threaded bolt by means of a tube which is connected directly or indirectly to the threaded bolt and can be transported together with the tensioning device.

The cable drum may advantageously be driven by an electric motor which can turn in both directions, since such an electric motor can be released in a very simple manner and under exact control. In addition, room can easily be found for it on the support device of the measuring arrangement because of its small volume.

In one advantageous arrangement, the movable support of the measuring apparatus carries the cable drum on a bridge which is unilaterally rotatable about a hinge on a pillow block; the pillow block, in turn, is carried on a base plate surrounding the tube and guided by it. This results in a rest position for the cable drum which is independent of the position of the base plate. Also, with this arrangement, the ratchet may be disengaged to release the tensioned cable when the bridge is in the rest position. To this end, a ratchet pawl, mounted on the base plate, is positioned to act as a detent only when tension on the cable rotates the bridge out of the rest position.

DETAILED DESCRIPTION OF THE INVENTION

Figure 1:
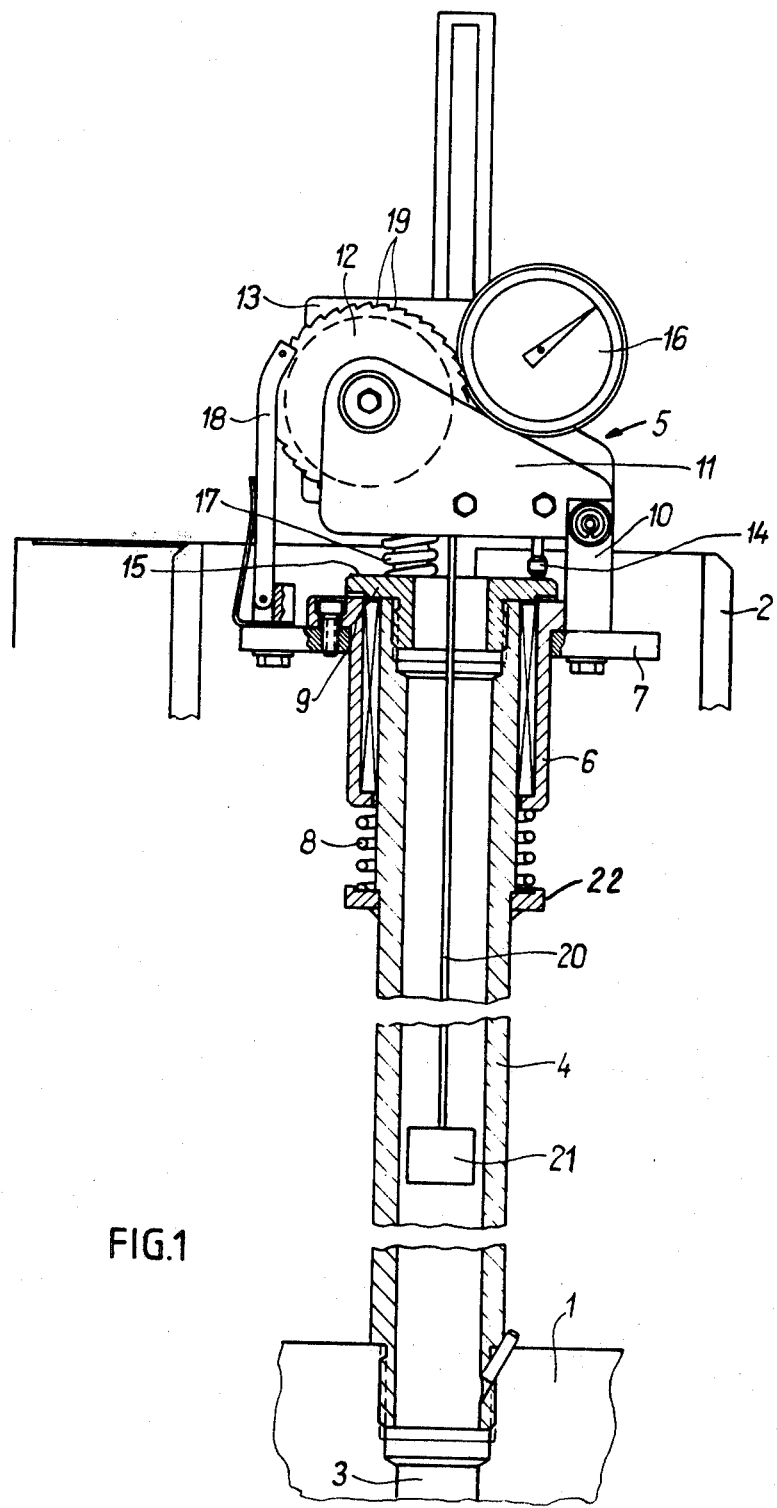
FIG. 1 is a side view in partial cross-section of an embodiment of the invention designed in accordance with the teachings of the invention.

The heads of reactor pressure vessels are closed by means of threaded bolts which are under pre-tension. For the purpose of automatically turning the nuts of the threaded bolt and thus elongating it to supply the pre-tension, tensioning devices 2 are used which include a tensioning bolt 1 connected to the threaded bolt, recesses which accommodate the threaded bolt and its nuts, as well as turning and tensioning units which act on the threaded bolt via the tensioning bolt 1. Only part of the tensioning device 2 is indicated schematically in the FIGURE, and in addition, only the upper end of the tensioning bolt 1 is shown. This end of tensioning bolt 1 is provided with a central hole 3 which is continued as a central, through hole in the threaded bolt and which, however, is closed at the head of the threaded bolt.

The tube 4 which carries the pre-tension measuring apparatus 5 is screwed into the upper end of the tensioning bolt 1 and passes through the tensioning device 2. The base plate 7, guided by a ball box 6, is arranged on the tube 4 and is thus freely movable in a longitudinal, or axial, direction on the tube 4. A spring 8, surrounding the tube 4 and resting on support ring 22, pushes the bottom of ball box 6 and, so urges the base plate 7 against an upper flange 9 of the tube 4. The pillow block 10 is carried on one side of base plate 7 and bridge 11 is hinged on it. A cable drum 12 and its electric reduction gear driving motor 13 are mounted on the bridge 11 along with the length measuring device 14. One end of the length measuring device 14 rests on the end face 15 of the upper flange 9 and operates an optical indicating device 16. The bridge 11 is always returned to its rest position by the spring 17. The base plate 7 also carries the spring loaded pawl 18 which is adapted to engage corresponding tooth recesses 19 on the rim of cable drum 12 and thereby prevent the cable drum from rotating. The pawl 18 is so arranged that it is disengaged if the bridge 11 is in the rest position.

The cable 20 which carries the electric holding magnet 21, is wound on the cable drum 12. The cable 20 itself can comprise the leads for the exciter coil of the electric holding magnet 21, or it may form the carrier for these leads.

In operation, the measuring apparatus can ascertain the pre-tension which is proportional to elongation of the threaded bolt in the following manner:

With the bridge 11 of the measuring apparatus 5 in the rest position, the pawl 18 is disengaged and the cable drum 12 can be rotated by the electric motor 13, lowering the holding magnet 21 on the end of cable 20 into the central hole of the threaded bolt. When the holding magnet 21 has reached the lowest point of the closed hole within the threaded bolt, it is excited and therefore adheres at that point. Tension is now placed on cable 20 by reversing the direction of rotation of the electric motor and the pawl 18 engages a recess 19 acting as a detent. The entire measuring assembly 5 is thus urged against the pressure of the spring 8 by the cable 20 and the holding magnet 21. The spring 8 therefore imparts to the cable 20 a certain amount of preliminary tension.

When the threaded bolt is stretched, it is elongated, but the length of the taut cable 20 remains unchanged because of the pawl 18. The entire measuring assembly 5 including indicator 16 therefore moves along the tube 4 towards the tensioning bolt 1. Since the end 14 of measuring indicator 16 rests on the surface 15 of the upper flange 9 of the tube 4, indicator gauge 16 measures the difference in length between the taut cable 20 and the threaded bolt connected to the tensioning bolt 1. The length of the tube 4 is chosen so that the indicator 16 can be read for the maximum elongation of the threaded bolt.

After the measuring operation is completed, the excitation of the electric holding magnet 21 is stopped, releasing the magnet from the bottom of the hole and the spring 17 pushes the bridge 11 into the rest position. The pawl 18 is thus disengaged and the cable 20 can be wound freely on the cable drum 12. The measuring arrangement 5 is then lifted off together with the tensioning device 2 via the tensioning bolt 1.

What is claimed is:

1. Apparatus for measuring the pre-tension of a threaded bolt useful for closing a reactor pressure vessel by measuring the difference in length between the threaded bolt and a part introduced into a drill hole in the bolt extending to its closed bottom, the part being fastened at the lowest point in the drill hole, comprising:
    an electric holding magnet carried on a cable running off a cable drum and adapted to pass into the drill hole of the threaded bolt being measured, the magnet being capable, when energized, of sticking to the lowest point in the hole,
    a tube connected directly or indirectly to the threaded bolt and having an upper flange and a spring surrounding the tube, and
    a movable support for the cable drum carried on the tube and urged by the spring against the upper flange when the cable is loose, the movable support carrying a ratchet for engaging the cable drum and maintaining the length of cable constant and under tension when the magnet is in its end position, and carrying a length measuring device having an end resting on a surface of the tube.

2. A measuring apparatus in accordance with claim 1 in which the cable drum is reversibly driven by an electric motor.

3. A measuring apparatus in accordance with claim 1 in which the cable drum support includes a base plate surrounding the tube and guided thereby and a bridge hinged on a pillow block carried by the plate.

4. A measuring apparatus in accordance with claim 3 in which the bridge is maintained at the rest position when the holding magnet is not energized.

5. A measuring apparatus in accordance with claim 4 in which the ratchet carried by the base plate comprises a pawl which is engaged when the cable is under tension and is disengaged when the bridge is in a rest position.

6. A measuring apparatus according to claim 3 in which a ball box on the base plate guides the base plate on the tube.

7. A measuring apparatus in accordance with claim 1 in which the cable comprises leads for the exciter coil of the electric holding magnet.

* * * * *